United States Patent [19]

Collins et al.

[11] 4,207,156

[45] Jun. 10, 1980

[54] ULTRAVIOLET PHOTOINITIATOR SYSTEMS UTILIZING AROMATIC SULFIDES AND TRIPLET STATE ENERGIZERS

[75] Inventors: George L. Collins, Murray Hill; John R. Costanza, N. Plainfield; Anthony B. Conciatori, Chatham, all of N.J.

[73] Assignee: Celanese Corporation, New York, N.Y.

[21] Appl. No.: 880,673

[22] Filed: Feb. 23, 1978

Related U.S. Application Data

[63] Continuation-in-part of Ser. No. 762,089, Jan. 24, 1977, abandoned.

[51] Int. Cl.² ............................ C08F 2/46; C08F 4/00
[52] U.S. Cl. ..................... 204/159.24; 204/159.15; 204/159.18; 427/54.1; 428/461; 428/463; 430/905; 430/913; 430/286
[58] Field of Search ................ 204/159.24, 159.18, 204/159.15; 96/115 P

[56] References Cited

U.S. PATENT DOCUMENTS

| | | | |
|---|---|---|---|
| 3,899,611 | 8/1975 | Hall | 427/54 |
| 3,903,322 | 9/1975 | Ravve et al. | 427/54 |

*Primary Examiner*—Richard B. Turer
*Attorney, Agent, or Firm*—Kenneth A. Genoni

[57] ABSTRACT

The preparation of rapidly curable ultraviolet coating compositions utilizing, in addition to standard photoinitiators, an aromatic sulfide is disclosed. Utilized in conjunction with the aromatic sulfide may be a triplet state sensitizer, such as a fused ring aromatic compound.

4 Claims, No Drawings

ULTRAVIOLET PHOTOINITIATOR SYSTEMS UTILIZING AROMATIC SULFIDES AND TRIPLET STATE ENERGIZERS

CROSS REFERENCE TO RELATED APPLICATION

This is a continuation-in-part of U.S. Pat. Application Ser. No. 762,089, filed Jan. 24, 1977, now abandoned.

BACKGROUND OF INVENTION

This invention relates to ultraviolet curable coating compositions. More particularly, this invention relates to ultraviolet coating compositions having improved cure rates.

Ultraviolet curable coating compositions have for several reasons required the use of large amounts of photoinitiators in typical formulations. These initiators are expensive and difficult to handle and are often insoluble in the final cured coating, or impart to it undesirable colors.

When the amounts of these photoinitiators are lowered to more desirable levels to reduce costs, color, and insolubility, the cure rate of the resulting compositions is greatly reduced. It is theorized that reduced curing is caused by insipient molecular oxygen which tends to retard the ultraviolet curing mechanism.

Thus, it is an object of this invention to prepare ultraviolet curable coating compositions.

It is another object of this invention to prepare coating compositions which utilize lower-than-normal amounts of ultraviolet photoinitiators.

It is another object of this invention to prepare ultraviolet curable coating compositions which are inexpensive and lightly colored.

These and other objectives are obtained by preparing the compositions of the instant invention.

SUMMARY OF INVENTION

Basically, the instant invention involves the discovery that typical ultraviolet curable coating compositions, i.e., coating compositions containing about 20 to about 100 percent, by weight, based on the curable composition, of a poly alpha beta ethylenically unsaturated material, and up to about 60 percent, by weight, on the same basis, of a monoethylenically unsaturated material in combination with standard photoinitiators, may be cured with lesser amounts of these photoinitiators if about 0.1 to about 5 percent, by weight, based upon the ultraviolet curable system, of an aromatic sulfide is utilized.

DESCRIPTION OF INVENTION

Aromatic sulfides of the instant invention are represented by the general formulae:

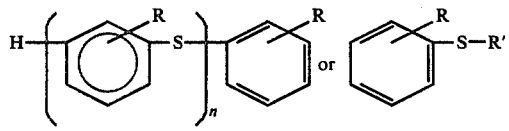

wherein R may be an alkyl of 1-8 carbon atoms, an aryl of 6-10 carbon atoms, halogen, hydroxy or hydrogen, and may be the same or different for each R, and R' may be alkyl of 1-8 carbon atoms or an aryl of 6-10 carbon atoms, and n is a whole number integer of 1 to 25.

Basically, the compounds of the instant invention include any of the aromatic materials which contain at least one sulfide linkage per molecule, and no other groups interferingly reactive with the ultraviolet curing mechanism.

Preferred among the aromatic sulfides are the polyaromatic sulfides, i.e., those compounds containing more than one aromatic group per molecule. Examples of the aromatic sulfides include, polyphenylene sulfide, polynaphthalene sulfide, diphenyl sulfide, phenylmenthyl sulfide, and the various chlorine, hydroxy and methyl substituted sulfides as above described. The aromatic sulfides of the instant invention should be added to the ultraviolet curable compositions described herein in amounts of from about 0.1 to about 5 percent, based on the total ultraviolet curable composition, preferably about 0.1 to about 0.5 percent, by weight.

Preferably added along with the aromatic sulfide of the instant invention, is a triplet sensitizer. These sensitizer materials under ultraviolet light are excited to the triplet energy state and then transfer their energy to the standard photoinitiator, which in turn is caused to be excited to its triplet energy state, and thus to photoinitiate.

Most preferred among the triplet sensitizers are those materials which have triplet energies in the range of about 40 to about 60 k cal/mole, preferably about 40 to about 45 k cal/mole. See the *Handbook of Photo Chemistry*, published by Marcel Dekker, New York.

Examples of such materials include Eosin-Y,

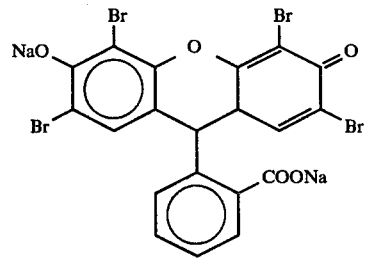

pyrene, fluorescein, transstilbene, and the like.

The ultraviolet curable compositions of the instant invention contain from about 20 to about 100 percent, by weight, based upon the total curable composition, of an alpha beta ethylenically unsaturated vinyl polymerizable compound containing at least two vinyl polymerizable groups per molecule. Included are unsaturated esters of polyols and particularly such esters of the alpha methylene carboxylic acids, e.g., ethylene glycol diacrylate, diethylene glycol diacrylate, glycerol diacrylate, glycerol triacrylate, ethylene glycol dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra- acrylate and methacrylate, trimethylolpropane triacrylate, trimethylolethane triacrylate, dipentaerythritol hexacrylate, tripentaerythritol octa-acrylate, sorbitol hexacrylate, 1,3-propanediol diacrylate, 1,5-pentanediol dimethacrylate, 1,6-hexanediol diacrylate, the bisacrylates and methacrylates of polyethylene glycols of a molecular weight of 200-1500, and the like; unsaturated amides, particularly those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, bis-methacrylamidoethyl methacrylate, N-beta-hydroxy-ethyl-beta-(methacrylamido) ethyl acrylate, and N,N-bis(beta-methacryloxyethyl) acrylamide; vinyl esters such as divinyl succinate, divinyl adipate, divinyl phthalate, divinyl terephthalate, divinyl benzene-1,3-disulfonate, and divinyl benzene-1,4-disulfonate, styrene and derivatives thereof and unsaturated aldehydes, such as sorbaldehyde (hexadienal). Outstanding classes of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

The polyethylenic unsaturation can be present as a substituent attached to a preformed polymer resin, such as an alkyd, a polyester, a polyamide, a polyurethane or a vinyl homo- or copolymer. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional "monomers", as described hereafter, the monounsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butoxy- or ethoxyethyl acrylates, hydroxyethyl acrylate, as well as others; the vinyl halides, such as vinyl chloride, vinylidene chloride, and the like; vinyl ketones such as vinyl phenyl ketone, vinyl methyl ketone, alpha-chlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These compounds may be added in amounts up to about 60 percent, by weight, based upon the total curable composition, preferably about 10 to about 30 percent.

The instant invention can also contain up to about 60 percent, by weight, based upon the total curable system of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly(methylacrylate), poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]hept-2-ene); polyethylene; polypropylene; synthetic rubbers, e.g., butadiene/acrylonitrile copolymers and chloro-2-butadiene 1,3 polymers; the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methyl methacrylate and vinylidene chloride/vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes, polyvinyl acetals, e.g., polyvinyl butryal, polyvinyl formal; the cellulose ethers, e.g., methyl cellulose, ethyl cellulose, and benzyl cellulose; the cellulose esters, e.g., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline- formaldehyde and acetone formaldehyde; phenolic resins and the like.

If desired, the instant system can also contain immiscible polymeric or non-polymeric organic or inorganic fillers or reinforcing agents, e.g., the organophilic silicas, bentonites, silica, powdered glass, colloidal carbon, as well as various other types of dyes and pigments, in varying amounts. The fillers are useful in improving the strength, reducing track and as coloring agents in the coatings of this invention.

The photosensitizers of photoinitiators used in the instant invention fall into many classes and include compounds such as benzoin derivatives, as disclosed in German Patent No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, thioxanthone, and chlorinated thioxanthones, 3-chloro-8-nonylxanthone, 3-methoxyxanthone, 3-iodo-7-methoxyxanthone, and the like.

Also included are the acetophenone photosensitizers of the type described in U.S. Pat. No. 3,715,293, having the structure

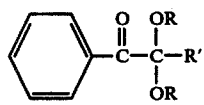
I.

wherein R is alkyl of from 1-8 carbon atoms, or aryl with 6 carbon atoms, and R' is hydrogen, alkyl of from 1-8 carbon atoms, aryl of from 6-14 carbon atoms or cycloalkyl of 5-8 carbon atoms.

The alkylphenone photosensitizers having the formula

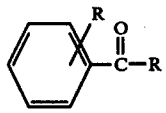
II.

the benzophenone type photosensitizers having the formula

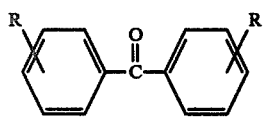
III.

the tricyclic fused ring type having the formula

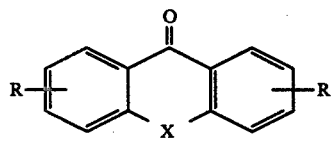
IV.

and the pyridyl type having the formula

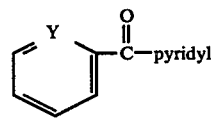
V.

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-naphthoquinone, 9-10-phenanthrenequinone, 1,2-benzanthraquinone, 2-3-benzanthraquinone, 2-methyl-1,4-naphthoquinone, 2-3-dichloronaphthoquinone, 1-4-dimethylanthraquinone, 2-3-dimethylanthraquinone, 2-phenylanthraquinone, 2-3-diphenylanthraquinone, sodium salts of anthraquinone alphasulfonic acid, 3-chloro-2-methylanthraquinone and the like. Other photoinitiators which are also useful are described in U.S. Pat. No. 2,760,863 and include vicinal ketadonyl compounds, such as diacetyl benzyl, etc., alpha ketadonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alpha allyl benzoin, and alpha phenyl benzoin. Also included are the diacylhalomethanes, corresponding to one of the general formulas:

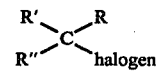

and

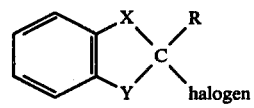

wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in *Industrie Cimique Belge*, 24 (1959), 739–764. Most preferred among the added initiators are benzoin and its alkyl ethers, benzophenone and its derivatives, as in Formula III, xanthone, thioxanthones, chlorinated thioxanthones, and acetophone derivatives, as set out in Formula I, and halogenated aliphatic and aromatic polychlorinated biphenyls and polyphenyls.

The prior art photosensitizers can be added in an amount of about 0.05 to about 15 percent, by weight, based upon the total curable system, preferably about 0.1 to about 5 percent. In any event, the total amount of prior art sensitizer which is required under this invention will be less than is required in the prior art.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary, and can be represented by the general formula:

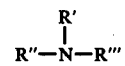

wherein R' and R" taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R'" has the same meaning as R' and R" with the exception that it cannot be hydrogen and that it cannot be aryl when both R' and R" are aryl. When taken together R" and R'" can be a divalent alkylene group $\hspace{-0.5em}-\hspace{-0.5em}(\hspace{-0.2em}C_nH_{2n}\hspace{-0.2em})\hspace{-0.5em}-\hspace{-0.5em}$ having from 2 to about 12 carbon atoms, a divalent alkenylene group $\hspace{-0.5em}-\hspace{-0.5em}(\hspace{-0.2em}C_nH_{2n-1}\hspace{-0.2em})\hspace{-0.5em}-\hspace{-0.5em}$ having from 3 to about 10 carbon atoms, a divalent alkadienylene group $\hspace{-0.5em}-\hspace{-0.5em}(\hspace{-0.2em}C_nH_{2n-2}\hspace{-0.2em})\hspace{-0.5em}-\hspace{-0.5em}$ having from 5 to about 10 carbon atoms, a divalent alkatrienylene group $\hspace{-0.5em}-\hspace{-0.5em}(\hspace{-0.2em}C_nH_{2n-3}\hspace{-0.2em})\hspace{-0.5em}-\hspace{-0.5em}$ having from 5 to about 10 carbon atoms, a divalent alkyleneoxyalkylene group $-(C_xH_{2x}OC_xH_{2x})-$ having a total of from 4 to about 12 carbon atoms, or a divalent alkyleneaminoalkylene group

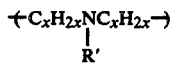

having a total of from 4 to about 12 carbon atoms. As previously indicated, the amines can be substituted with other groups; thus, the R', R" and R''' variables, whether taken singly or together, can contain one or more substituents thereon. The nature of such substituents is generally not of significant importance and any substituent group can be present that does not exert a pronounced deterrent effect on the ultraviolet crosslinking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyldimethylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4- picoline, morpholine, N-methyl morpholine, N-2-hydroxyethylmorpholine, N-2-ethoxyethylmorpholine, piperazine, N-methylpiperazine, N,N"-dimethylpiperazine, 2,2-dimethyl-1,3-bis[3-(N-morpholinyl)-propionyloxy]-propane, 1,5-bis[3-(N-morpholinyl)-propionyloxy]-diethyl ether, and the like. The preferred organic amines are the tertiary amines, with the alkanol amines being most preferred. The specific preferred amine activators are tri-ethanolamine, morpholine and methyldiethanolamine.

The compositions of the instant invention after being prepared in the ratios as set out above can be applied to the material to be coated by conventional spraying means, and may, if desired, be dried under ambient or oven conditions to provide coating films on the substrate. The substrate can be of any composition, e.g., wood, metal, paper, plastic, fabric, fiber, ceramic, concrete, plaster glass, etc.

Typically, a mixture of the compositions described above in combination with the initiator and, where utilized, the amine activator, is prepared and the composition applied to the desired substrate. It is then exposed to electromagnetic radiation having wave lengths of above about 2000 Angstrom units, preferably from about 2000 up to about 5000 Angstroms. Exposure should be from a source located about 1 to 5 inches from the coating for a time sufficient to cause crosslinking of the compositions and can range from about 0.1 seconds up to about 1 minute. Generally, the light radiation will have power of about 200 watts per linear inch.

The light radiation can be ultraviolet light generated from low, medium and high pressure mercury lamps. This equipment is readily available and its use is well known to those skilled in the art of radiation chemistry.

In the following examples, all parts and percentages are by weight, unless otherwise indicated.

EXAMPLE 1

The following blend was prepared: 43.3 parts of rutile titanium dioxide, 27.2 parts hexanediol diacrylate, 7.3 parts of the diacrylate ester of the diglycidyl ether of bisphenol A, 6.4 parts of a polyester resin containing acrylic unsaturation, 12.9 parts of trimethylolpropane triacrylate, 2.3 parts of dimethylethanol amine, and 9.5 parts of 1% hydroquinone in hexanediol diacrylate. This material was catalyzed with 1% by weight benzoin isobutyl ether. It was applied to a cold rolled steel panel to a thickness of about 1.5 to 3 mils and subjected to 5 passes under a 200 watt per linear inch medium pressure mercury lamp at a line speed of 10 ft/min. No cure resulted.

EXAMPLE 2

Example 1 was repeated except that 3% by weight benzoin isobutyl ether was utilized, and 2 passes under the ultraviolet lamp were employed. No cure resulted.

EXAMPLE 3

Example 2 was repeated except that in addition to the 3% by weight benzoin isobutyl ether, 0.2% by weight of a poly(phenylene sulfide) having a number average molecular weight of about 10,000 and 0.1% by weight Eosin Y were utilized. The film which resulted was cured after 2 passes.

What is claimed is:

1. An ultraviolet curable coating composition consisting essentially of about 20 to about 100 percent by weight, based on the total curable composition, of an alpha beta ethylenically unsaturated vinyl polymerizable compound containing at least two vinyl polymerizable groups per molecule, up to about 60 percent by weight, on the same basis, of an alpha beta ethylenically unsaturated compound containing a single polymerizable alpha beta ethylenically unsaturated group, about 0.05 to about 15 percent by weight, on the same basis, of an ultraviolet photoinitiator, about 0.1 to about 5.0 percent by weight, on the same basis, of poly(phenylene sulfide), and about 0.05 up to about 0.1 percent by weight, on the same basis, of a triplet state sensitizer having a triplet state energy in the range of about 40 to about 60 k cal/mole selected from Eosin-Y, pyrene, fluorescein and trans-stilbene.

2. The composition of claim 1 in admixture with an amine activator.

3. An ultraviolet curable coating composition consisting essentially of about 20 to about 100 percent by weight, based on the total curable composition, of an alpha beta ethylenically unsaturated vinyl polymerizable compound containing at least two vinyl polymerizable groups per molecule, up to about 60 percent by weight, on the same basis, of an alpha beta ethylenically unsaturated compound containing a single polymerizable alpha beta ethylenically unsaturated group, about 0.05 to about 15 percent by weight, on the same basis, of an ultraviolet photoinitiator, about 0.1 to about 5.0 percent by weight, on the same basis, of poly(naphthalene sulfide), and about 0.05 up to about 0.1 percent by weight, on the same basis, of a triplet state sensitizer having a triplet state energy in the range of about 40 to about 60 k cal/mole selected from Eosin-Y, pyrene, fluorescein and trans-stilbene.

4. The composition of claim 3 in admixture with an amine activator. --

* * * * *